(12) United States Patent
Chen et al.

(10) Patent No.: US 11,609,155 B2
(45) Date of Patent: Mar. 21, 2023

(54) DUAL-DRIVE WHEEL TRACK CHANGING SYSTEM

(71) Applicant: Jilin University, Jilin (CN)

(72) Inventors: Rong Chen, Jilin (CN); Dongya Wang, Jilin (CN); Jian Su, Jilin (CN); Weiwei Zhang, Jilin (CN); Cheng Zhang, Jilin (CN); Wenjie Qiu, Jilin (CN); Huiying Lin, Jilin (CN); Tingting Zhu, Jilin (CN); Xiaofeng Miao, Jilin (CN)

(73) Assignee: JILIN UNIVERSITY, Jilin (CN)

( * ) Notice: Subject to any disclaimer, the term of this patent is extended or adjusted under 35 U.S.C. 154(b) by 151 days.

(21) Appl. No.: 17/413,477

(22) PCT Filed: Nov. 10, 2020

(86) PCT No.: PCT/CN2020/127723
§ 371 (c)(1),
(2) Date: Jun. 11, 2021

(87) PCT Pub. No.: WO2021/223390
PCT Pub. Date: Nov. 11, 2021

(65) Prior Publication Data
US 2022/0307943 A1 Sep. 29, 2022

(30) Foreign Application Priority Data
May 6, 2020 (CN) .......................... 202010374463.X

(51) Int. Cl.
*G01M 17/10* (2006.01)
(52) U.S. Cl.
CPC .................. *G01M 17/10* (2013.01)

(58) Field of Classification Search
CPC ..................................................... G01M 17/10
See application file for complete search history.

(56) References Cited

U.S. PATENT DOCUMENTS

| | | | | |
|---|---|---|---|---|
| 1,817,380 A | * | 8/1931 | Heinrich | B61K 9/08 246/121 |
| 2011/0174934 A1 | * | 7/2011 | Kikuchi | B61L 1/187 246/122 R |

FOREIGN PATENT DOCUMENTS

| | | |
|---|---|---|
| CN | 205656018 U | 10/2016 |
| CN | 108680371 A | 10/2018 |
| CN | 109696317 A | 4/2019 |

(Continued)

OTHER PUBLICATIONS

International Search Report for PCT Patent App. No. PCT/CN2020/127723 (dated Jan. 28, 2021).

*Primary Examiner* — Eric S. McCall
(74) *Attorney, Agent, or Firm* — Kenealy Vaidya LLP

(57) ABSTRACT

Disclosed is a dual-drive wheel track changing system suitable for a research on track changing performance, including a four-hole connected track changing force measurement rocker arm (3) mounted on a central shaft seat (6). The four-hole connected track changing force measurement rocker arm (3) is connected a track changing driving actuator (5) and No. 1 and No. 2 dual-ring connected force measurement sensors (4-1, 4-2). Left and right lifting support track changing moving bodies (1, 2) are connected to the dual-ring connected force measurement sensors (4-1, 4-2). The system is simple in structure, and can verify track changing feasibility and stability of the wheel pairs by simulating track changing movement.

8 Claims, 14 Drawing Sheets

(56) References Cited

FOREIGN PATENT DOCUMENTS

| | | | |
|---|---|---|---|
| CN | 110631847 | A | 12/2019 |
| CN | 110702432 | A | 1/2020 |
| CN | 111024418 | A | 4/2020 |
| CN | 111366385 | A | 7/2020 |
| CN | 111366386 | A | 7/2020 |
| GB | 2377258 | A | 1/2003 |

* cited by examiner

DUAL-DRIVE WHEEL TRACK CHANGING SYSTEM

CROSS REFERENCE TO RELATED APPLICATION(S)

This application is a national phase filing under 35 C.F.R. § 371 of and claims priority to PCT Patent Application No. PCT/CN2020/127723 filed on Nov. 10, 2020, which claims priority to the Chinese Patent Application No. 202010374463.X filed on May 6, 2020, the contents of each of which are hereby incorporated by reference in their entireties.

BACKGROUND

Some embodiments of the present disclosure relate to a track changing system, in particular, to a dual-drive wheel track changing system suitable for a research on track changing performance, and to a train track gauge changing technology, and belongs to the field of train track changing.

With the development of economy and high technology, railway transportation is conveniently and widely used. In view of the differences of railway track gauges in different countries and regions, it is an urgent to research a track gauge changing technology. However, the track changing feasibility and stability of wheel pairs need to be further tested and researched before a track changing train is put into production. Therefore, a dual-drive wheel track changing system suitable for a research on track changing performance provided by the present disclosure is simple in structure, can measure a required track changing force while simulating actual track changing movement of the track changing train, and can effectively verify the track changing performance of the wheel pairs of the train through tests, thereby facilitating analyzing the track changing feasibility and stability of the wheel pairs.

SUMMARY

In order to solve the difficult problems of unstable track changing and automatic track changing of wheel pairs in the existing track gauge changing technology, the present disclosure provides a dual-drive wheel track changing system suitable for a research on track changing performance, which aims to verify the continuous track changing feasibility of the wheel pairs and verify the track changing reliability before actual application of a track changing train.

The following will clearly and completely describe the technical solution of the present disclosure with reference to the accompanying drawings. Apparently, the described embodiments are part rather than all or most of the embodiments of the present disclosure. The embodiments enumerated below are merely for further understanding and implementation of the technical solution of the present disclosure, and do not constitute further limitation of the claims of the present disclosure. Therefore, based on the embodiments of the present disclosure, all or most other embodiments obtained by those of ordinary skill in the art without creative work fall within the scope of protection of the present disclosure.

In the descriptions of the present disclosure, if orientations or positional relationships indicated by the involved terms, for example, "center", "upper", "lower", "left", "right", "vertical", "horizontal", "inside", and "outside", are the orientations or positional relationships shown on the basis of the accompanying drawings, and are merely for the convenience of describing the present disclosure and simplifying the description, rather than indicating or implying that the devices or parts (elements) must or should have particular orientations, and constructed and operated in particular orientations. Thus, it cannot be construed as a limitation to the present disclosure.

In the descriptions of the present disclosure, it should be noted that, unless otherwise specified and defined explicitly, the terms "mounted", "interconnected", and "connected" are to be interpreted broadly, may be, for example, fixedly connected, or detachably connected, or integrally connected, may be mechanically connected, or electrically connected, may be directly connected, or indirectly connected through an intermediate medium, or internally communicated between two elements, or may be flexibly connected, rigidly connected or movably connected. Those of ordinary skill in the art may understand specific meanings of the above terms in the present disclosure in specific cases.

A dual-drive wheel track changing system suitable for a research on track changing performance includes a left lifting support track changing moving body 1, a right lifting support track changing moving body 2, a four-hole connected track changing force measurement rocker arm 3, a No. 1 dual-ring connected force measurement sensor 4-1, a No. 2 dual-ring connected force measurement sensor 4-2, a track changing driving actuator 5, and a central shaft seat 6. The four-hole connected track changing force measurement rocker arm 3 is connected to each of the left lifting support track changing moving body 1 and the right lifting support track changing moving body 2 through the No. 1 dual-ring connected force measurement sensor 4-1 and the No. 2 dual-ring connected force measurement sensor 4-2. The left lifting support track changing moving body 1 and the right lifting support track changing moving body 2 are arranged on the left side and the right side of the central shaft seat 6. The track changing driving actuator 5 drives, through the four-hole connected track changing force measurement rocker arm 3, the left lifting support track changing moving body 1 and the right lifting support track changing moving body 2 to change tracks.

Further, the four-hole connected track changing force measurement rocker arm 3 includes a four-hole connected track changing force measurement rocker arm body 7, two four-hole connected track changing force measurement rocker arm bearing pin shaft bodies 8 mounted on the four-hole connected track changing force measurement rocker arm body 7, a central shaft seat force measurement rocker arm connecting bearing 9, and a track changing driving connecting pin shaft 10. The four-hole connected track changing force measurement rocker arm 3 is connected to the central shaft seat 6 through the central shaft seat force measurement rocker arm connecting bearing 9, and is connected to each of the No. 1 and No. 2 dual-ring connected force measurement sensors 4-1 and 4-2 through the two four-hole connected track changing force measurement rocker arm bearing pin shaft bodies 8, and is connected to the track changing driving actuator 5 through the track changing driving connecting pin shaft 10.

Further, the left lifting support track changing moving body 1 and the right lifting support track changing moving body 2 are of the same structure. The left lifting support track changing moving body 1 includes a left mounting guide track bottom plate 11, a left track changing sliding middle plate body 12, a left lifting airbag 13, a left track changing vertical moving upper plate 14 and wheels 15. The left mounting guide track bottom plate 11 is fixedly mounted on a peripheral integral Ema beam structure. Two long guide tracks are arranged on the left mounting guide track bottom plate. The left track changing sliding middle plate body 12 includes four left vertical lifting moving guide posts 17 and left track changing guide track sliding clamping seat sliding block bodies 18, and a No. 1 bearing pin shaft body 19. The left vertical lifting moving guide posts 17 and the left track changing guide track sliding clamping seat sliding block bodies 18 are respectively arranged at the four corners of the upper surface and the lower surface of a left track changing sliding support middle plate 16. Ribs are arranged on the lower surface of the left track changing sliding support middle plate 16. The four left vertical lifting moving guide posts 17 are mounted on the left track changing sliding support middle plate 16 through left track changing sliding support middle plate through hole cylinders 16-2 respectively. The No. 1 bearing pin shaft body 19 is mounted on the left track changing sliding support middle plate 16 through a left track changing sliding support middle plate protruding hollow cuboid 16-1. The four left track changing guide track sliding clamping seat sliding block bodies 18 are fixed to the lower surface of the left track changing sliding support middle plate 16 through bolting bodies 20 respectively, and are matched with the two long guide tracks on the guide track bottom plate 11. A circular hole in one end of the No. 1 dual-ring connected force measurement sensor is placed in the protruding hollow cuboid 16-1 and is coaxial with the circular hole of the hollow cuboid, so that the No. 1 bearing pin shaft body 19 is arranged therein in a sleeving manner to connect the four-hole connected track changing force measurement rocker arm 3 to the left track changing sliding support middle plate 16.

Further, the left track changing vertical moving upper plate 14 includes a left track changing vertical moving upper plate base plate 21, four drive wheel assembling bearing seats 22, eight bearing seat connecting plate bolted assembling bodies 23, a left No. 1 drive wheel 24-1, a left No. 2 drive wheel 24-2, a left motor drive wheel roller chain wheel 25, a left dual-drive wheel connecting chain 26, and a left planetary reducer motor assembling body 27. A circular hole corresponding to the protruding hollow cuboid 16-1 is formed in the left lifting moving upper plate base plate 21. Hollow left vertical moving upper plate bottom plate bearing cylinders 28 are arranged at the four corners of the left track changing vertical moving upper plate base plate 21, are assembled with the four left vertical lifting moving guide posts 17 in the left track changing sliding middle plate body 12 in a matched manner through linear movement bearings 29 arranged in the cylinders, and move up and down along the guide posts.

Further, the left lifting airbag 13 is placed between the left track changing sliding support middle plate 16 and the left track changing vertical moving upper plate 14, and is circumferentially fixed to the left track changing sliding support middle plate 16 by bolts.

Further, two ribbed plates are arranged on the left lifting moving upper plate base plate 21. The left No. 1 drive wheel 24-1 and the left No. 2 drive wheel 24-2 are respectively fixed to the ribbed plates through the drive wheel assembling bearing seats 22, and are connected through the left dual-drive wheel connecting chain 26. The left No. 1 drive wheel 24-1 is driven by the left motor drive wheel roller chain wheel 25 through the left planetary reducer motor assembling body 27. The wheels 15 are placed on the left No. 1 drive wheel 24-1 and the left No. 2 drive wheel 24-2 to simulate actual track changing movement of the wheel pairs.

Further, the track changing driving actuator 5 is located on one side of the left lifting support track changing moving body 1. A track changing driving actuator connecting base 5-2 is mounted on the peripheral Ema beam structure through a shaft seat 30. A track changing driving actuator connecting lock ring 5-1 is connected to the four-hole connected track changing force measurement rocker arm 3 through the track changing driving connecting pin shaft 10 to achieve an effect of pushing track changing.

Further, the central shaft seat 6 is fixed between the left and right lifting support track changing moving bodies. The centers of the bottom surfaces of the central shaft seat 6 and the left and right lifting support track changing moving bodies are in a straight line. The central shaft seat 6 is bolted to the external integral structure constructed by Ema beams. A central shaft seat force measurement rocker arm connecting shaft 6-1 is connected to the four-hole connected track changing force measurement rocker arm body 7 by penetrating through the central shaft seat force measurement rocker arm connecting bearing 9. The two ends of the No. 1 and No. 2 dual-ring connected force measurement sensors 4-1 and 4-2 are connected to the four-hole connected track changing force measurement rocker arm body 7 through the four-hole connected track changing force measurement rocker arm bearing pin shaft bodies 8 respectively. The two dual-ring connected force measurement sensors and the track changing force measurement connecting rocker arm are connected and arranged in a Z shape.

Compared with the related art, the present disclosure has the following beneficial effects:

1. The left lifting support track changing moving body and the right lifting support track changing moving body in the dual-drive wheel track changing system suitable for a research on track changing performance of the present disclosure are of the same structure, and are distributed on the two sides of the central shaft seat. Each lifting support track changing moving body includes two drive wheels, which is convenient for stable placement of the track changing wheel pairs, is convenient for the drive wheels and the wheels to run together to ensure the success and accuracy of track changing movement, and can also avoid the instability of a single drive wheel. The lifting airbag in the track changing support lifting body can be controlled to inflate and deflate to make the drive wheels be in contact with or separated from the wheels, which facilitates track changing and high-speed rotating of the wheel pairs.

2. The four-hole connected track changing force measurement rocker arm body of the four-hole connected track changing force measurement rocker arm in the dual-drive wheel track changing system suitable for a research on track changing performance of the present disclosure includes four circular holes with different sizes. The hole 2 is the largest and can act as a fulcrum of a lever. The sizes of the hole 1 and the hole 3 are the same, which facilitates connecting the four-hole connected track changing force measurement rocker arm body to the dual-ring connected force measurement sensors. The hole 4 is used for connecting the four-hole connected track changing force measurement rocker arm body to the track changing driving actuator connecting lock ring. The positions of the four circular holes are not randomly distributed. The ratio of the distance from the hole 2 to the hole 4 to the distance from the hole 2 to the hole 1 or from the hole 2 to the hole 3 is about 2.2, which is calculated according to the range of 100 mm of the used actuator and the realized track changing in the system relying on the mechanical knowledge.

3. The dual-drive wheel track changing system suitable for a research on track changing performance of the present disclosure can effectively verify the track changing performance of the track changing wheel pairs. In addition, the system can also realize unlocking-track changing-locking movement in actual track changing of the track changing wheel pairs with other equipment, and can also perform a research on a fatigue test of track changing.

DETAILED DESCRIPTION

The present disclosure is further described in detail below with reference to the accompanying drawings, and those of ordinary skilled in the art can implement with reference to the text of the description.

Figure 1:
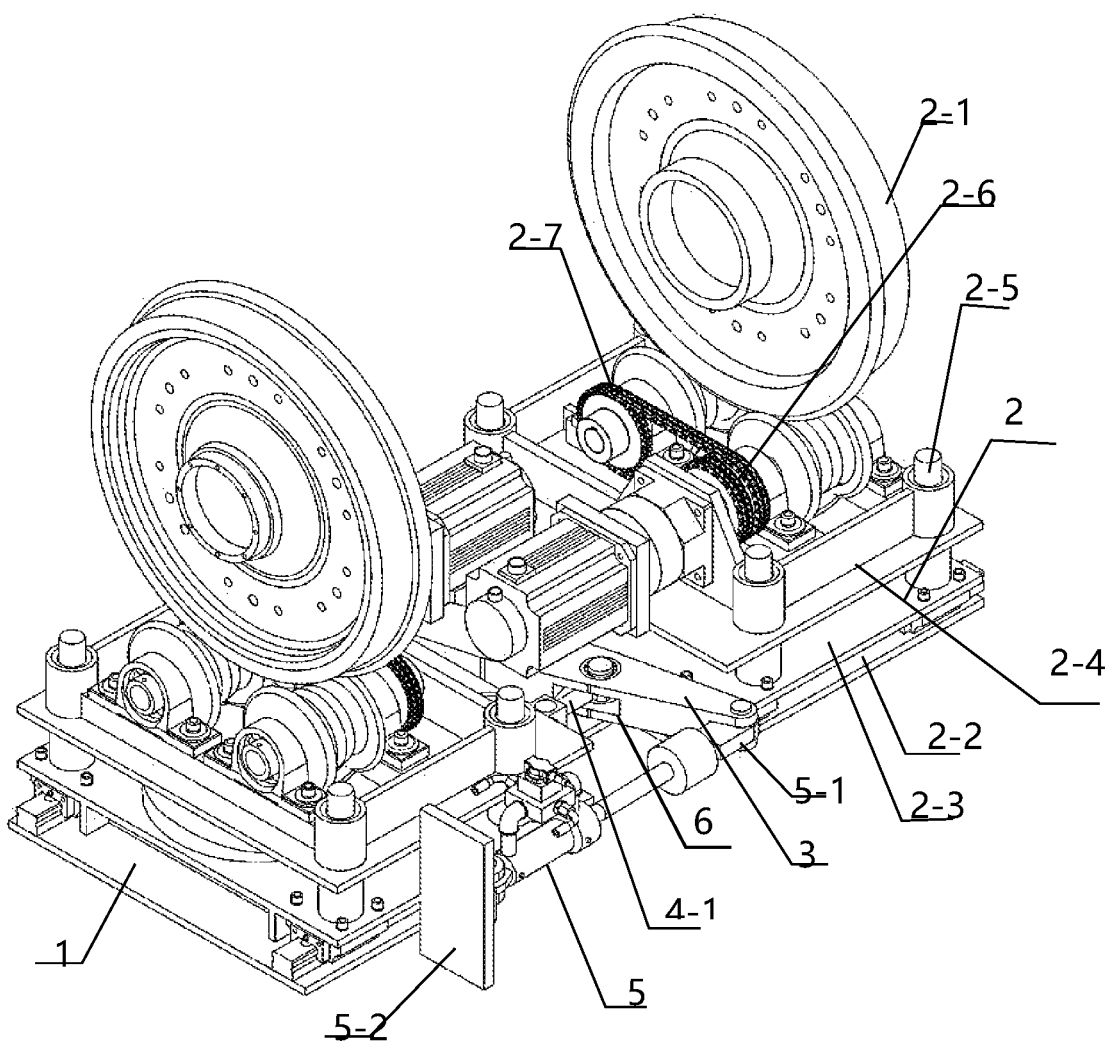
FIG. 1 is a front axonometric drawing of a dual-drive drive wheel track changing system
Figure 2:
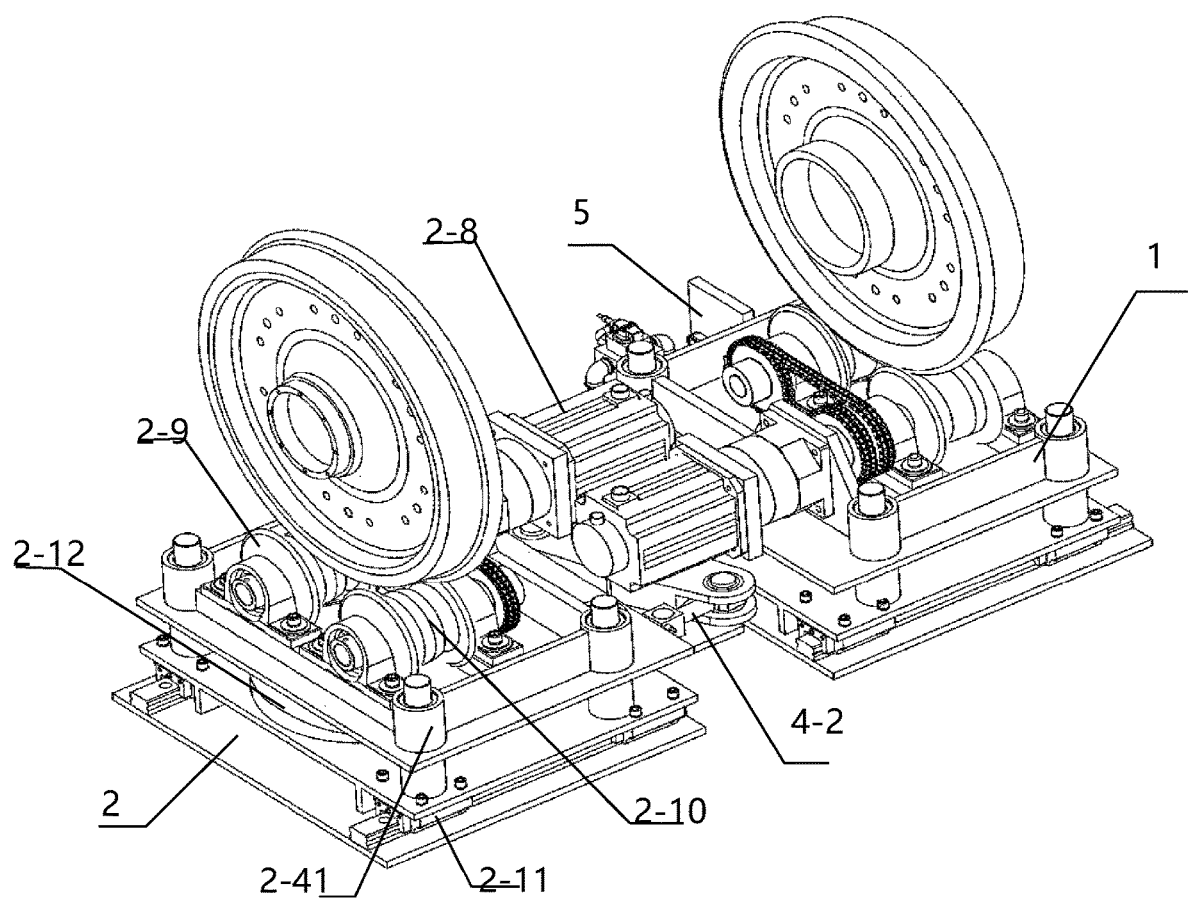
FIG. 2 is a back axonometric drawing of the dual-drive drive wheel track changing system
Figure 3:
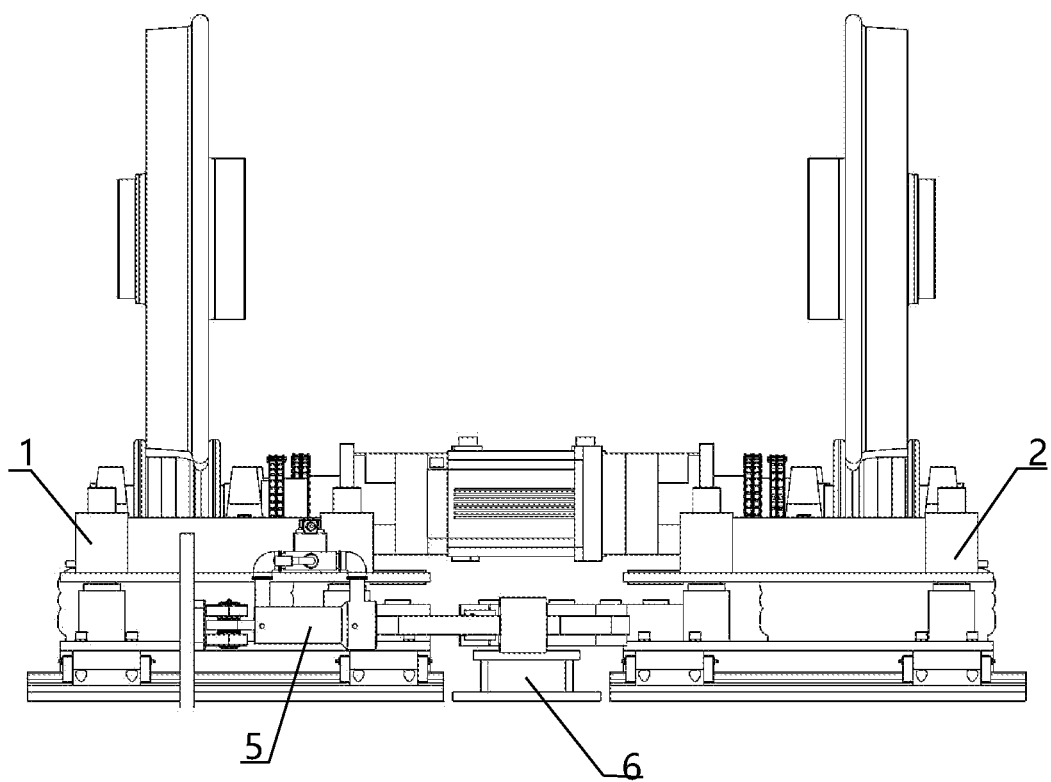
FIG. 3 is a right view of the dual-drive drive wheel track changing system

Referring to FIG. 1 to FIG. 3, a dual-drive wheel track changing system suitable for a research on track changing performance of the present disclosure includes a four-hole connected track changing force measurement rocker arm 3, a No. 1 dual-ring connected force measurement sensor 4-1 and a No. 2 dual-ring connected force measurement sensor 4-2 connected to the two sides of the four-hole connected track changing force measurement rocker arm 3, a left lifting support track changing moving body 1 and a right lifting support track changing moving body 2 connected to the four-hole connected track changing force measurement rocker arm 3 through the No. 1 dual-ring connected force measurement sensor 4-1 and the No. 2 dual-ring connected force measurement sensor 4-2, and a central shaft seat 6 that is fixedly mounted on the structure to act as a mounting seat of the four-hole connected track changing force measurement rocker arm 3, and a track changing driving actuator 5 connected to one end of the four-hole connected track changing force measurement rocker arm 3 through a pin shaft.

The left lifting support track changing moving body 1 and the right lifting support track changing moving body 2 of the present disclosure are of the same structure, and include the same components. The right lifting support track changing moving body 2 and the left lifting support track changing moving body 1 are oppositely placed at a rotating angle of 180 degrees on a horizontal plane, so they are distributed symmetrically about a diagonal line. The central shaft seat 6 is fixedly placed between the left lifting support track changing moving body 1 and the right lifting support track changing moving body 2 to act as a rotating center of the horizontal planes of the left lifting support track changing moving body 1 and the right lifting support track changing moving body 2. The four-hole connected track changing force measurement rocker arm 3 is mounted on the central shaft seat 6. The four-hole connected track changing force measurement rocker arm 3 is arranged on the two sides of a circular hole of the central shaft seat 6 to connect the No. 1 dual-ring connected force measurement sensor 4-1 and the No. 2 dual-ring connected force measurement sensor 4-2. The other sides of the No. 1 dual-ring connected force measurement sensor 4-1 and the No. 2 dual-ring connected force measurement sensor 4-2 are connected to the left lifting support track changing moving body 1 and the right lifting support track changing moving body 2, so as to achieve the effects of connecting and changing tracks synchronously. The track changing driving actuator 5 is transversely placed on one side of the left lifting support track changing moving body 1. A track changing driving actuator connecting base 5-2 is connected to a vertical shaft seat of an integral structure. At a working end, a track changing driving actuator connecting lock ring 5-1 is connected to the four-hole connected track changing force measurement rocker arm 3 to achieve the effect of pushing track changing.

Figure 4:
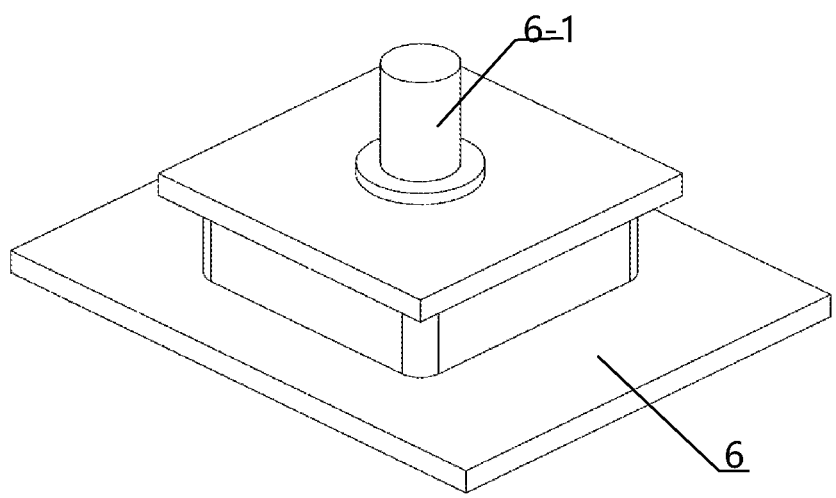
FIG. 4 is an axonometric drawing of a central shaft seat
Figure 5:
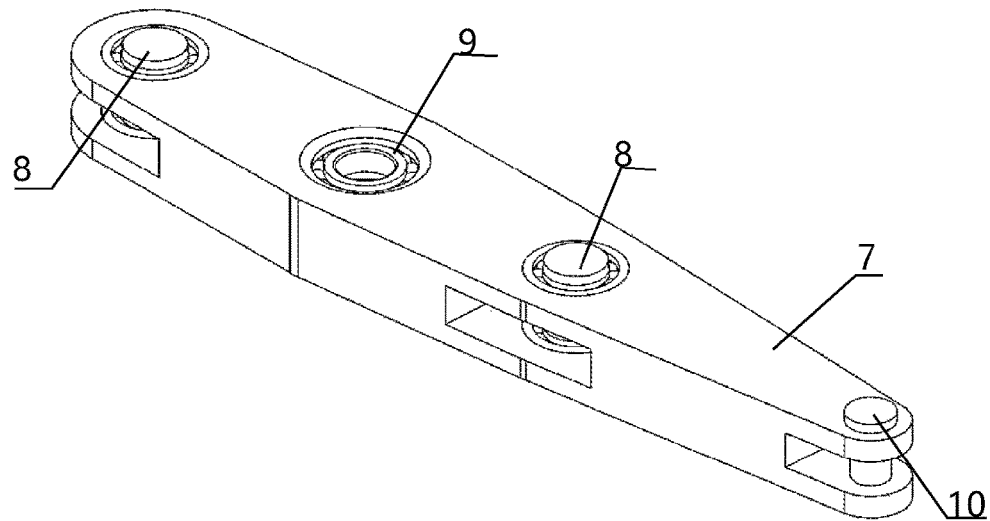
FIG. 5 is an axonometric drawing of a four-hole connected track changing force measurement rocker arm
Figure 6:
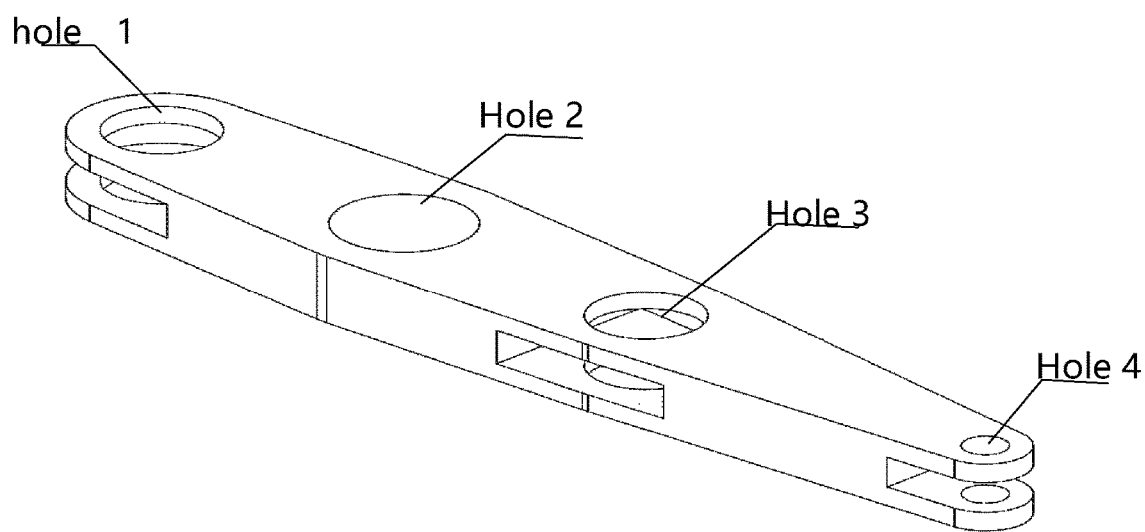
FIG. 6 is an axonometric drawing of a four-hole connected track changing force measurement rocker arm body
Figure 7:
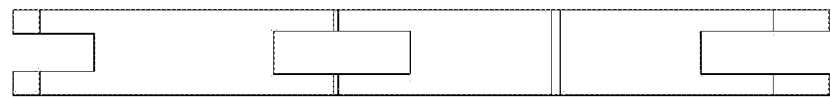
FIG. 7 is a rear view of the-hole connecting track changing force measurement rocker arm body
Figure 8:
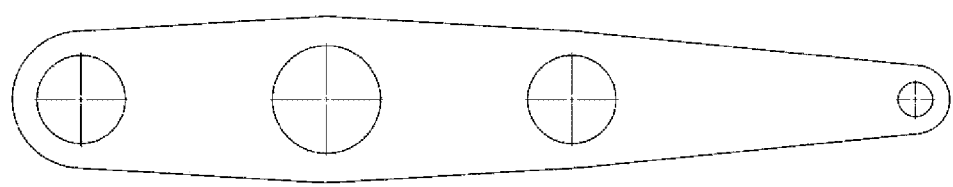
FIG. 8 is a top view of the four-hole connected track changing force measurement rocker arm body
Figure 9:
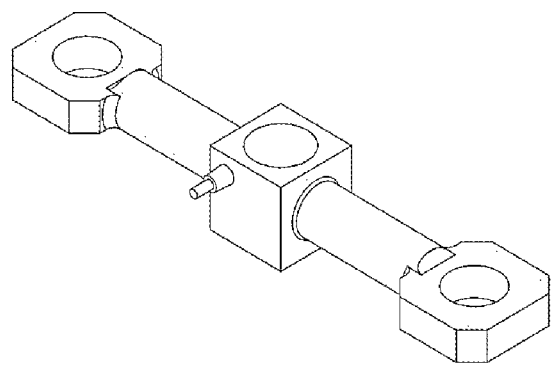
FIG. 9 is an axonometric drawing of a dual-ring connected force measurement sensor
Figure 10:
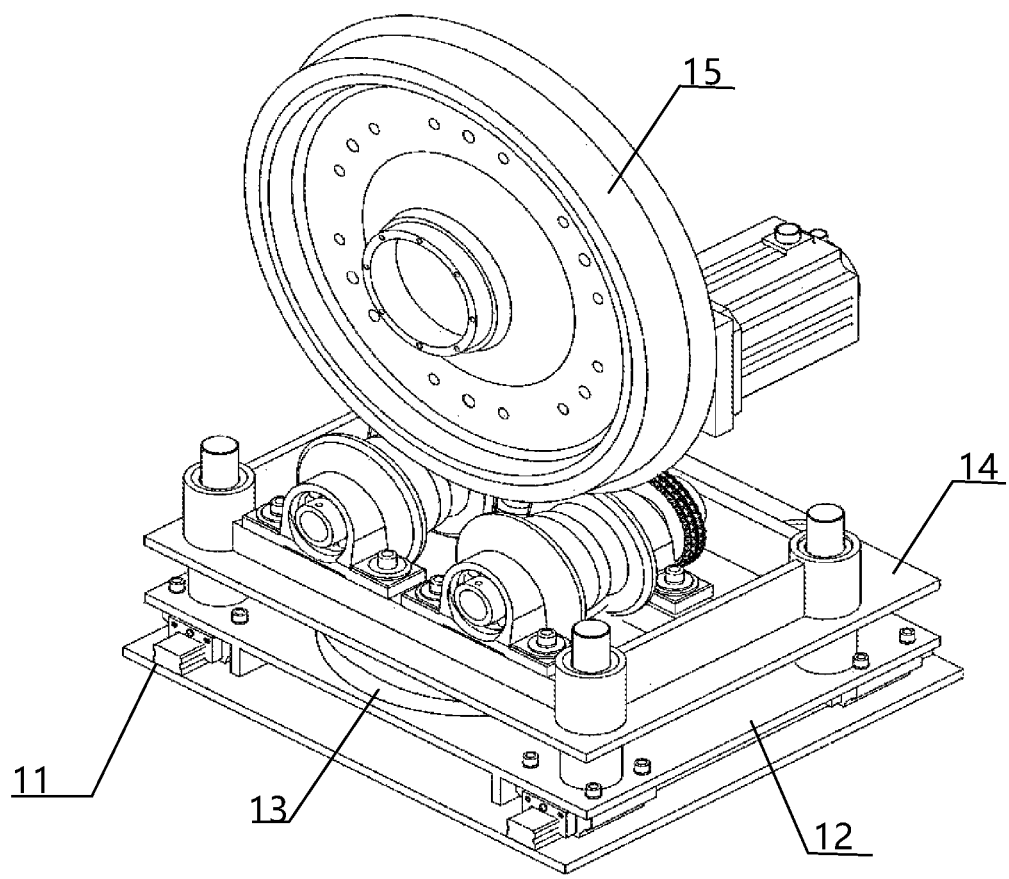
FIG. 10 is an axonometric drawing of a left lifting support track changing moving body
Figure 11:
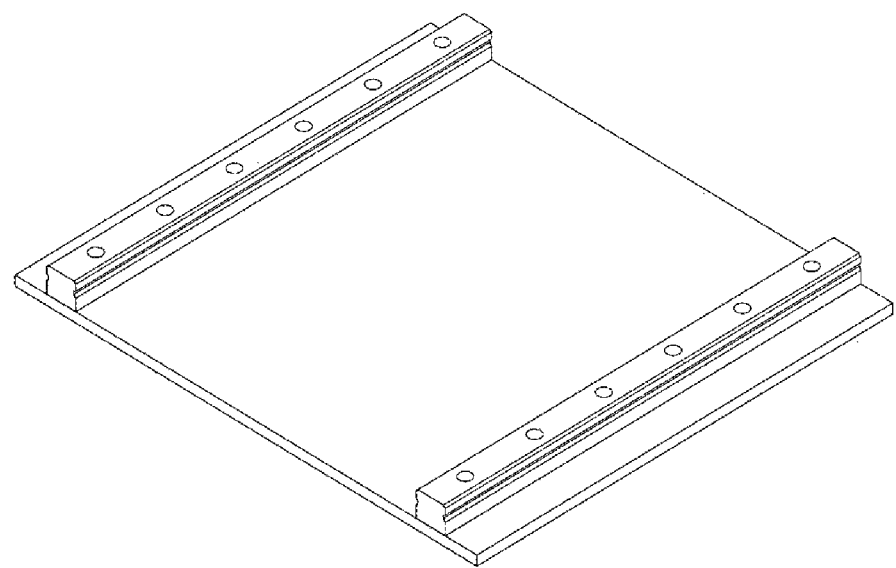
FIG. 11 is an axonometric drawing of a left mounting guide track bottom plate
Figure 12:
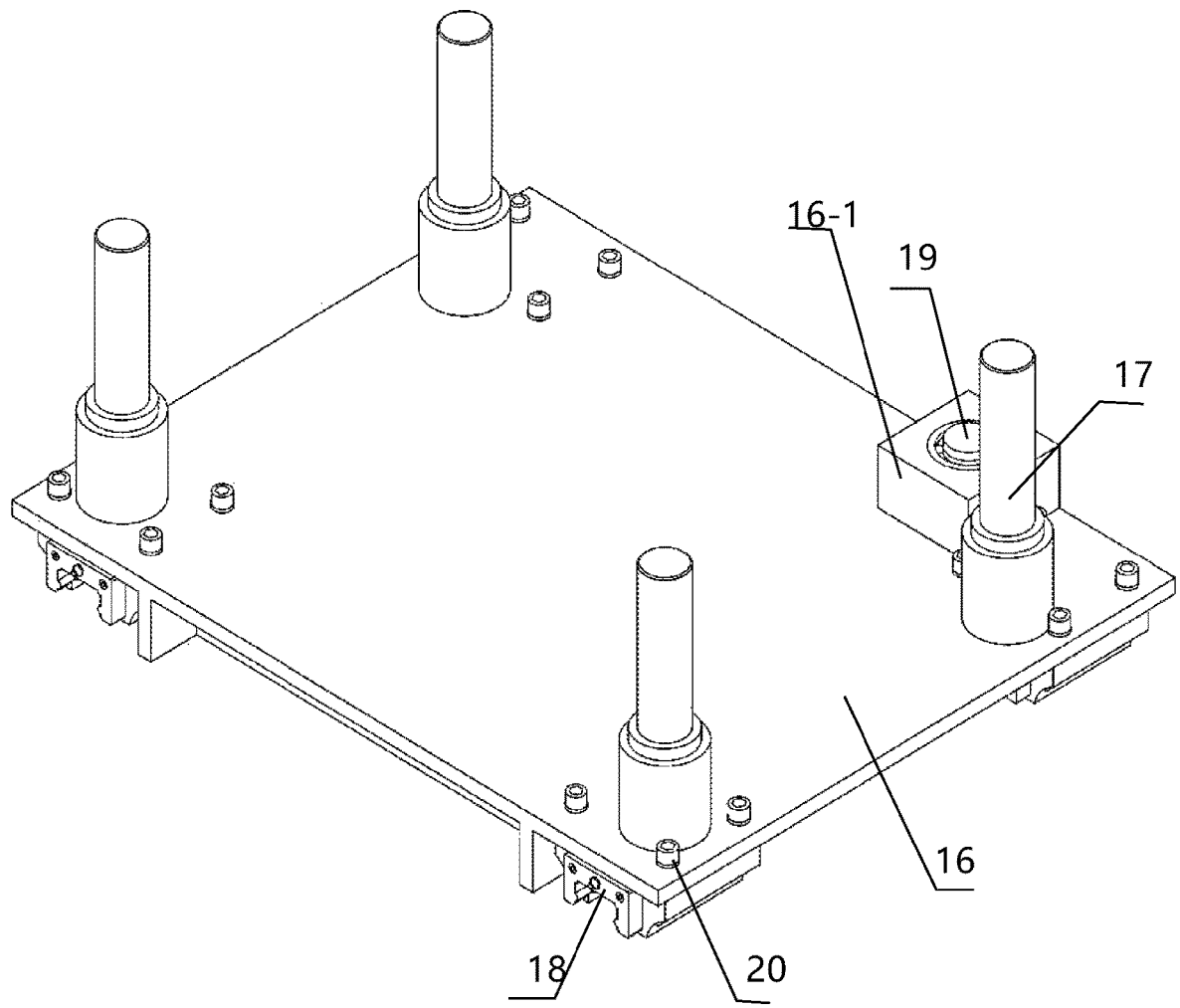
FIG. 12 is an axonometric drawing of a left track changing sliding middle plate body
Figure 13:
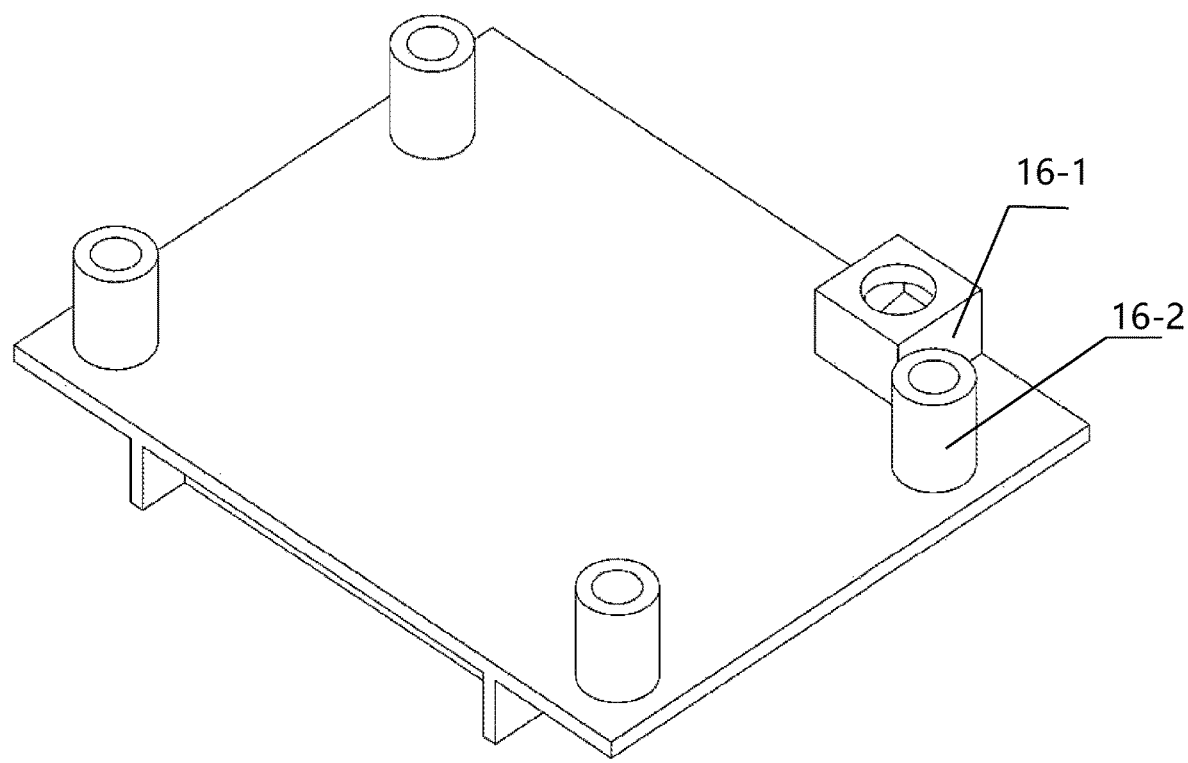
FIG. 13 is an axonometric drawing of a left track changing sliding support middle plate
Figure 14:
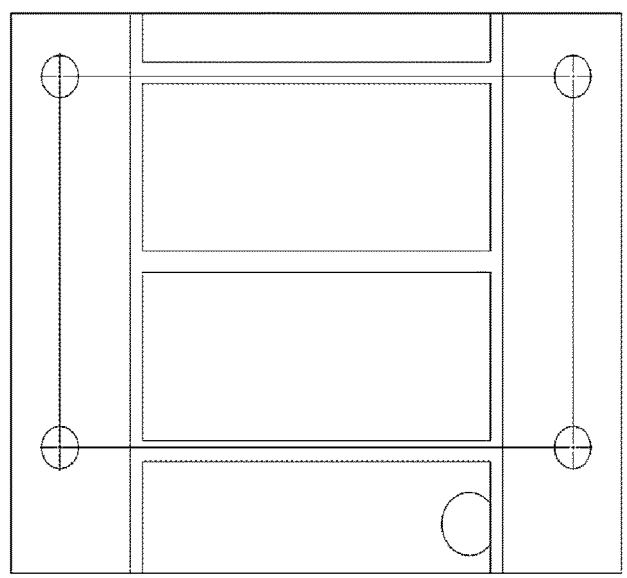
FIG. 14 is a bottom view of the left track changing sliding support middle plate
Figure 15:
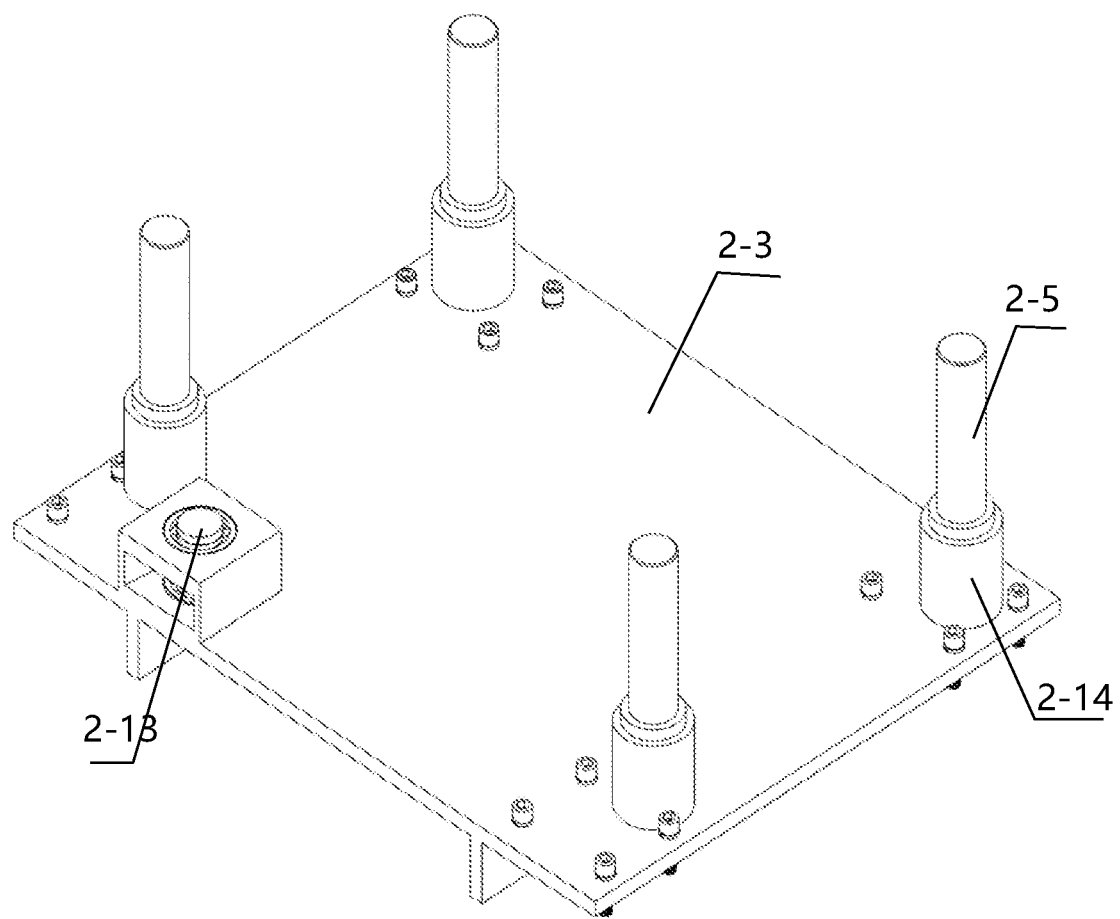
FIG. 15 is an axonometric drawing of a right sliding middle plate support body
Figure 16:
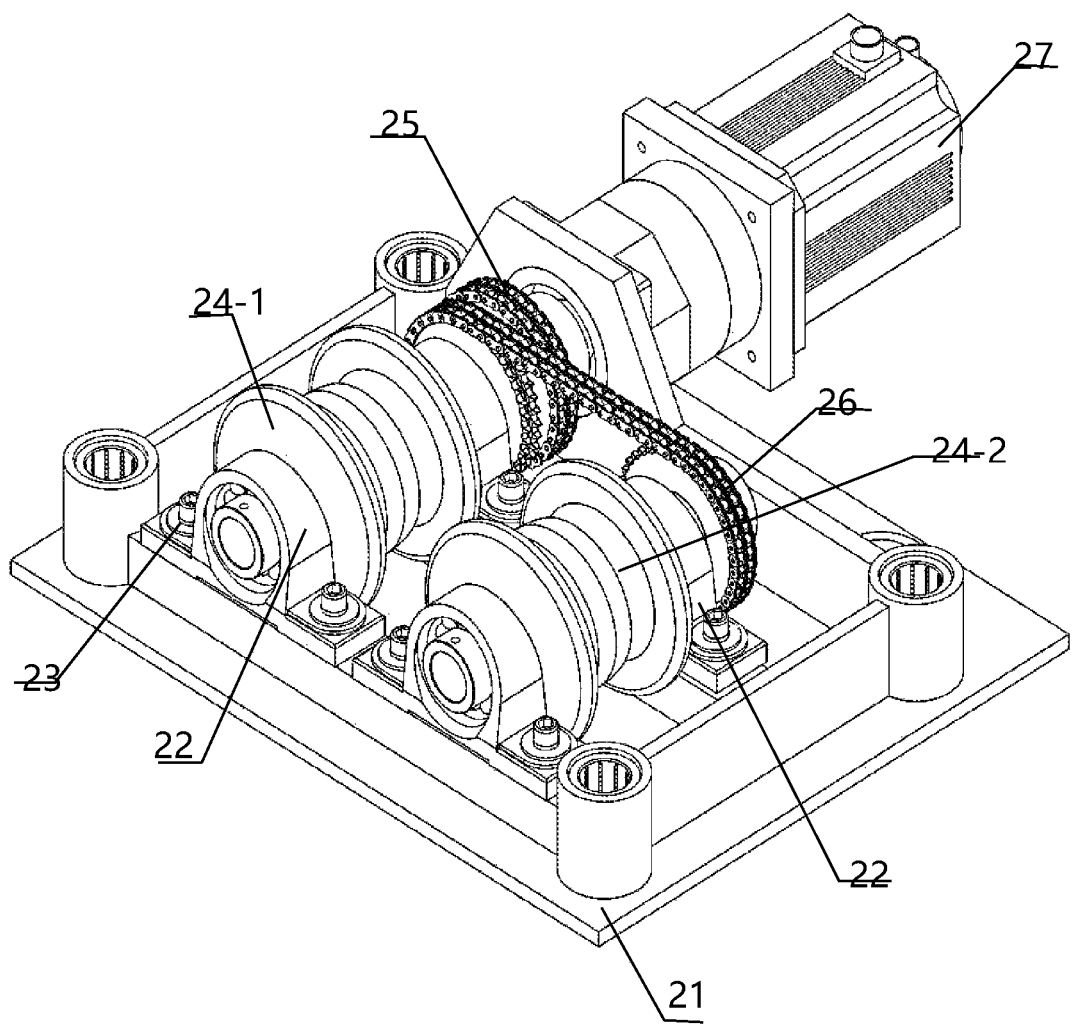
FIG. 16 is an axonometric drawing of a left track changing vertical moving upper plate
Figure 17:
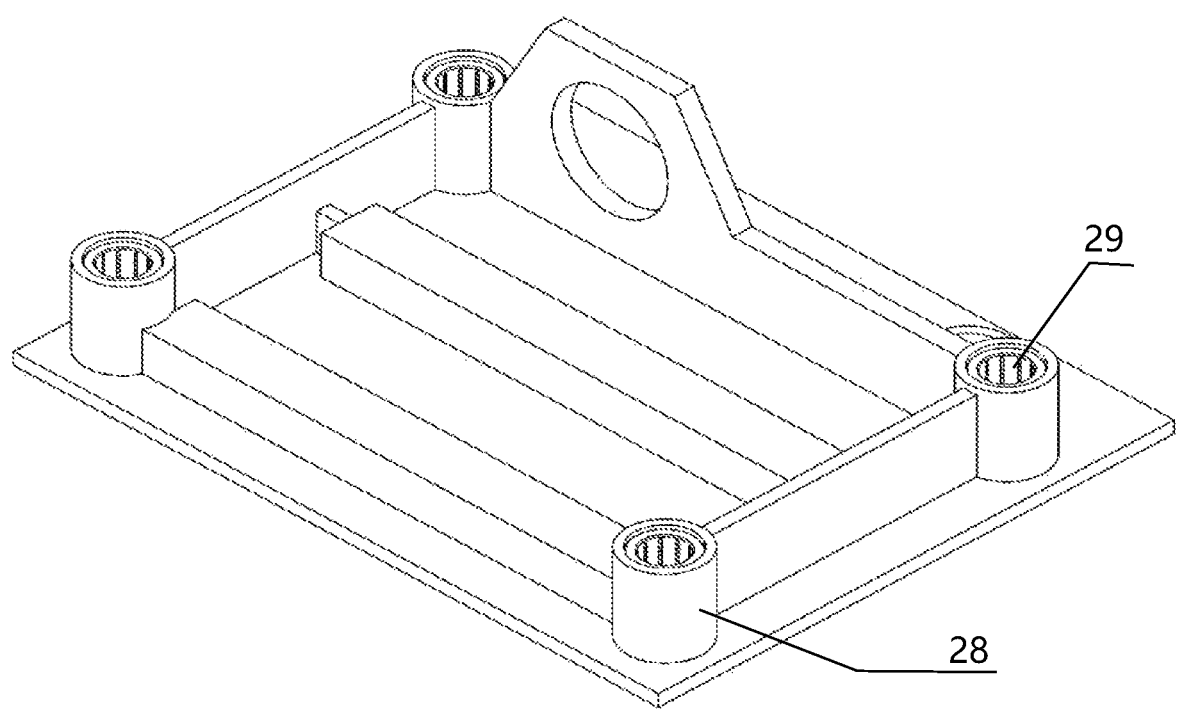
FIG. 17 is an axonometric drawing of a left track changing vertical moving upper plate base plate
Figure 18:
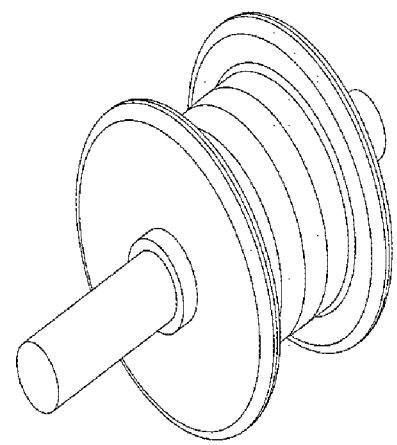
FIG. 18 is an axonometric drawing of a drive wheel
Figure 19:
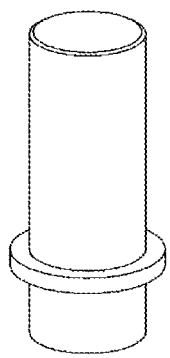
FIG. 19 is a front view of a lifting moving guide post
Figure 20:
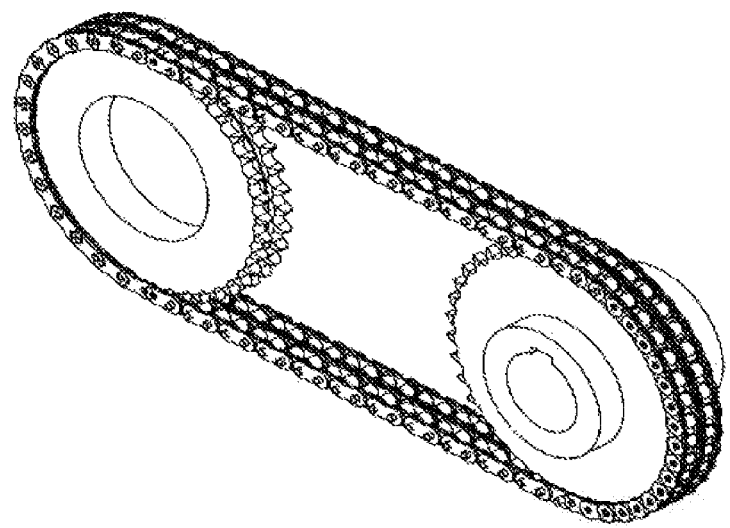
FIG. 20 is an axonometric drawing of a dual-drive wheel connecting chain
Figure 21:
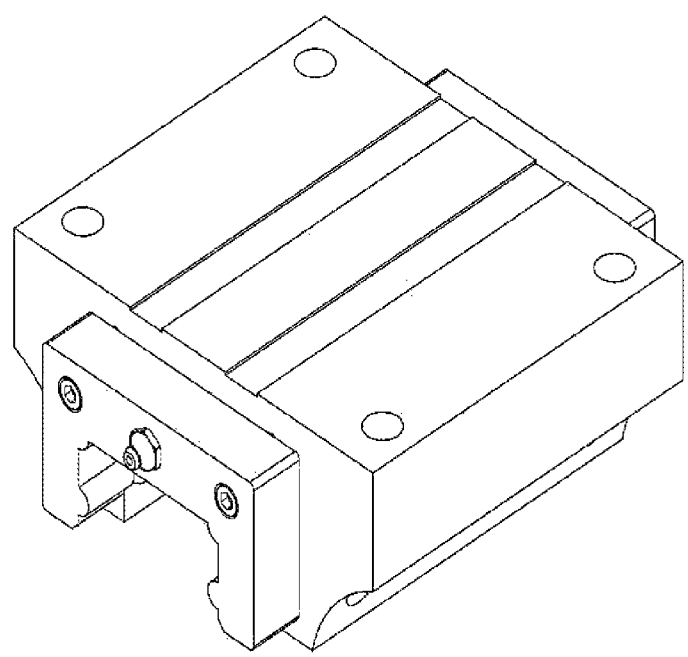
FIG. 21 is an axonometric drawing of a sliding guide track sliding seat body

Referring to FIG. 4 and FIG. 9, the central shaft seat 6 is fixedly placed between the left and right lifting support track changing moving bodies along a central line, so that the centers of the bottom surfaces of the central shaft seat 6 and the left and right lifting support track changing moving bodies are in a straight line. The central shaft seat 6 is generally of a cuboid structure, and the bottom surface is larger and is connected to an external integral structure constructed by Ema beams by bolts to achieve the effects of fixing and stabilizing. The upper surface is slightly smaller than the bottom surface. A central shaft seat force measurement rocker arm connecting shaft 6-1 is arranged at the central position of the upper surface. The four-hole connected track changing force measurement rocker arm 3 includes a four-hole connected track changing force measurement rocker arm body 7, four-hole connected track changing force measurement rocker arm bearing pin shaft bodies 8, a central shaft seat force measurement rocker arm connecting bearing 9, and a track changing driving connecting pin shaft 10. The upper bottom surface of the four-hole connected track changing force measurement rocker arm body 7 is formed by constructing two rhombus-like plates. Four circular holes with different sizes are formed in the upper surface. The four circular holes are not distributed uniformly. There is a proportional relationship among the positions of circular holes. The ratio of the distance from the hole 2 to the hole 4 to the distance from the hole 2 to the hole 3 (or the hole 1) is about 2.2. This proportional relationship is calculated according to the range of the actuator and the ultimate movement objective relying on mechanical knowledge. The central shaft seat force measurement rocker arm connecting shaft 6-1 is connected to the four-hole connected track changing force measurement rocker arm body 7 by penetrating through the central shaft seat force measurement rocker arm connecting bearing 9. Through holes with the same size are formed in the two ends of the No. 1 and No. 2 dual-ring connected force measurement sensors 4-1 and 4-2 for connecting. The circular hole in one end of each of the dual-ring connected force measurement sensors 4-1 and 4-2 is connected to the four-hole connected track changing force measurement rocker arm body 7 by arranging the four-hole connected track changing force measurement rocker arm bearing pin shaft bodies 8 therein in a sleeving manner. The two dual-ring connected force measurement sensors and the track changing force measurement connecting rocker arm are connected and arranged in a Z shape.

Referring to FIG. 10 to FIG. 21, the left lifting support track changing moving body 1 includes a left mounting guide track bottom plate 11, a left track changing sliding middle plate body 12, a left lifting airbag 13, a left track changing vertical moving upper plate 14, and wheels 15. The left mounting guide track bottom plate 11 is mounted on a peripheral integral Ema beam structure by taking a rectangular plate with a certain thickness as a bottom surface. Two long guide tracks are arranged on the rectangular plate along the two short edges. The left track changing sliding middle plate body 12 includes a left track changing sliding support middle plate 16, four left vertical lifting moving guide posts 17, four left track changing guide track sliding clamping seat sliding block bodies 18, a No. 1 bearing pin shaft body 19, and a bolting body 20. The upper surface of the left track changing sliding support middle plate 16 is a rectangular plate. Two long ribbed plate strips are arranged on the inner surface of the bottom of the plate along the short edges. Three small ribs spaced at the same distance are arranged between two ribbed plate strips. The small ribs and the long ribbed plates are vertically distributed to achieve the effects of supporting and stabilizing. A left track changing sliding support middle plate through hole cylinder 16-2 is arranged at the position, close to each of the four corners, of the upper surface of the rectangular plate, and holes of the cylinders penetrate through a support plate. A left vertical lifting moving guide post 17 is arranged in each of the four cylinders. A protruding hollow cuboid 16-1 is arranged at the position, close to the cylinder, of one side. The cuboid is constructed by three side plates and an upper plate by taking the middle plate support base plate as a bottom surface. A circular hole penetrates through the center of the cuboid. The four left track changing guide track sliding clamping seat sliding block bodies 18 are respectively connected to the four corners inside the left track changing sliding support middle plate 16 through the bolting bodies 20 and correspond to two long guide tracks on the mounting guide track bottom plate 11, so that the guide sliding rail seat body can move transversely along the two long guide tracks, thereby completing track changing. The circular hole in the other side of the No. 1 dual-ring connected force measurement sensor is placed in the protruding hollow cuboid 16-1 and is coaxial with the circular hole of the hollow cuboid, so that the No. 1 bearing pin shaft body 19 is arranged therein in a sleeving manner, one end of the No. 1 dual-ring connected force measurement sensor is connected to the four-hole connected track changing force measurement rocker arm 3, and the other end of the No. 1 dual-ring connected force measurement sensor is connected to the left track changing sliding support middle plate 16.

The left track changing vertical moving upper plate 14 includes a left track changing vertical moving upper plate base plate 21, four drive wheel assembling bearing seats 22, eight bearing seat connecting plate bolted assembling bodies 23, a left No. 1 drive wheel 24-1, a left No. 2 drive wheel 24-2, a left motor drive wheel roller sprocket 25, a left dual-drive wheel connecting chain 26, and a left planetary reducer motor assembling body 27. The left track changing vertical moving upper plate base plate 21 is a square plate with a certain thickness. A through hole is formed in the plate, and the position of the through hole corresponds to the circular hole of the protruding hollow cuboid 16-1. A hollow left vertical moving upper plate bottom plate bearing cylinder 28 is arranged at each of the four corners of the plate. Linear movement bearings 29 are arranged in the cylinders. The four left vertical lifting moving guide posts 17 in the left track changing sliding middle plate body 12 can be arranged on the linear movement bearings 29 in the left vertical moving upper plate bottom plate bearing cylinders 28 in a sleeving manner, so that the upper plate base plate can move up and down along the direction of the guide posts. The left lifting airbag 13 is placed between the left track changing sliding support middle plate 16 and the left track changing vertical moving upper plate 14, and is circumferentially fixed to the left track changing sliding support middle plate 16 by bolts. A ribbed plate is arranged between the bearing cylinders at the two short edges of the outer surface of the upper plate base plate 21. Two square plates are arranged in an area enclosed by four bearing cylinders. Cylinder shafts on the two sides of the left No. 1 drive wheel 24-1 and the left No. 2 drive wheel 24-2 are connected to the two square plates on the base plate 21 through the drive wheel assembling bearing seats 22 and the bearing seat connecting plate bolting assembling bodies. The left dual-drive wheel connecting chain 26 is connected between the two drive wheels, and an irregular vertical plate is arranged between the bearing cylinders at the long edge of one side of the base plate 21. A large circular hole is formed in one side of the vertical plate. The position of the circular hole corresponds to a cylinder shaft of a drive wheel. The left motor drive wheel roller chain wheel 25 is arranged on the corresponding cylinder shaft in a sleeving manner. The shaft of the left planetary reducer motor assembling body 27 is connected to the left motor drive wheel roller chain wheel 25 through the large circular hole in the irregular vertical plate, so that the motor drives the double drive wheels to rotate. The wheels 15 are placed on the left No. 1 and No. 2 drive wheels 24-1 24-2, which facilitates simulating actual track changing movement of the wheel pairs.

Figure 22:
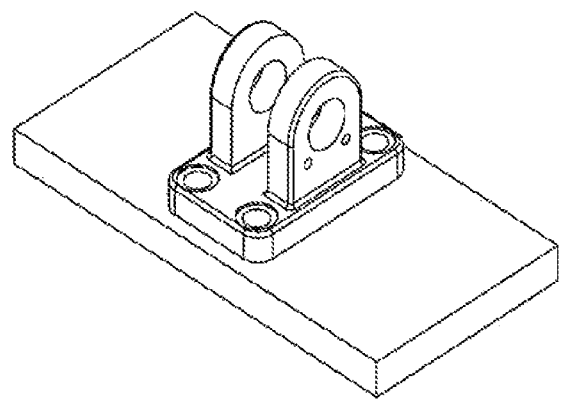
FIG. 22 is an axonometric drawing of a track changing driving actuator connecting base
Figure 23:
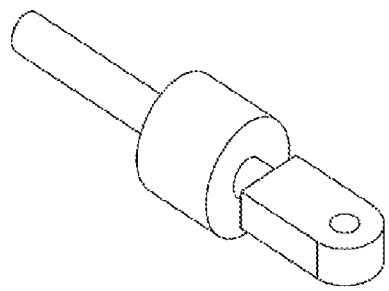
FIG. 23 is an axonometric drawing of a track changing driving actuator connecting lock ring
Figure 24:
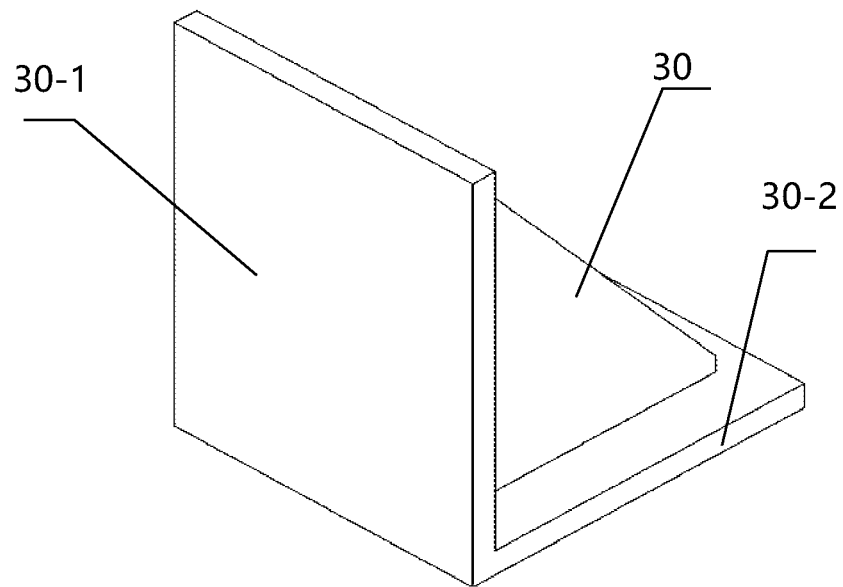
FIG. 24 is an axonometric drawing of a shaft seat In the drawings: 1—left lifting support track changing moving body, 2—right lifting support track changing moving body, 2-1—wheel, 2-2—mounting guide track bottom plate, 2-3—right track changing sliding support middle plate base plate, 2-4—right lifting moving upper plate base plate, 2-41—right upper plate base plate bearing cylinder, 2-5—right vertical lifting moving guide post, 2-6—right motor drive wheel roller chain wheel, 2-7—right dual-drive wheel connecting chain, 2-8—right planetary reducer motor assembling body, 2-9—right No. 1 drive wheel, 2-10—right No. 2 drive wheel, 2-11—right track changing guide track sliding clamping seat sliding block body, 2-12—right lifting airbag, 2-13—No. 2 bearing pin shaft body, 2-14—right track changing sliding support middle plate through hole cylinder, 3—four-hole connecting track changing force measurement rocker arm, 4-1—No. 1 dual-ring connected force measurement sensor, 4-2—No. 2 dual-ring connected force measurement sensor, 5—track changing driving actuator, 5-1—track changing driving actuator connecting lock ring, 5-2—track changing driving actuator connecting base, 6—central shaft seat, 6-1—central shaft seat force measurement rocker arm connecting shaft, 7—four-hole connecting track changing force measurement rocker arm body, 8—four-hole connecting track changing force measurement rocker arm bearing pin shaft body, 9—central shaft seat force measurement rocker arm connecting bearing, 10—track changing driving connecting pin shaft, 11—left mounting guide track bottom plate, 12—left track changing sliding middle plate body, 13—left lifting airbag, 14—left track changing vertical moving upper plate, 15—wheel, 16—left track changing sliding support middle plate, 16-1—left track changing sliding support middle plate protruding hollow cuboid, 16-2—left track changing sliding support middle plate through hole cylinder, 17—left vertical lifting moving guide post, 18—left track changing guide track sliding clamping seat sliding block body, 19—No. 1 bearing pin shaft body, 20—bolting body, 21—left track changing vertical moving upper plate base plate, 22—drive wheel assembling bearing seat, 23—bearing seat connecting plate bolting assembling body, 24-1—left No. 1 drive wheel, 24-2—left No. 2 drive wheel, 25—left motor drive wheel roller chain wheel, 26—left dual-drive wheel connecting chain, 27—left planetary reducer motor assembling body, 28—left vertical moving upper plate bottom plate bearing cylinder, 29—linear movement bearing, 30—shaft seat, 30-1—shaft seat surface 1, and 30-2—shaft seat surface 2.

Referring to FIG. 22 to FIG. 24, the track changing driving actuator 5 is placed on one side of the left lifting support track changing moving body. The track changing driving actuator connecting base 5-2 included in the track changing driving actuator 5 is fixedly mounted on the first surface 30-1 of the shaft seat 30 by bolts. The second surface 30-2 of the shaft seat 30 is mounted on an external Ema beam structure. A circular hole in the track changing driving actuator connecting lock ring 5-1 is connected to the four-hole connected track changing force measurement rocker arm 3 through the track changing driving connecting pin shaft 10 to achieve an effect of pushing track changing.

The central seat 6 of the dual-drive wheel track changing system suitable for a research on track changing performance of the present disclosure is placed at a central position. The left lifting support track changing moving body 1 and the right lifting support track changing moving body 2 of the same structure are arranged on the two sides of the central shaft seat 6. The planetary reducer motor assembling body and the dual-ring connected force measurement sensors are mounted on the same side of the track changing support lifting body. The side faces the central shaft seat, which is convenient for realizing track changing movement.

A specific movement process (taking the change from wide rail gauge to narrow rail gauge as an example) is as follows:

Step 1, the left and right lifting airbags 13 and 2-12 can be inflated to push the left and right lifting moving upper plates to move upwards along the left and right vertical lifting moving guide posts 17 and 2-5, so that double drive wheels are in contact with the wheel pairs. The left and right planetary reducer motor assembling bodies 27 and 2-8 drive the No. 1 drive wheel 1 mounted with the left and right drive roller chain wheels 26 to rotate, and drive the No. 2 drive wheel to rotate synchronously through the left and right dual-drive wheel connecting chains 26 and 2-7 connected thereto. The wheels 15 and 2-1 placed on the No. 1 drive wheel and the No. 2 drive wheel are driven to start rotating by the drive wheels.

Step 2, after a command is given, the track changing driving actuator 5 receives the command. A rod in the actuator starts to move outwards. The rod pushes the four-hole connected track changing force measurement rocker arm 3 that is connected to the track changing driving actuator connecting lock ring 5-1 and is mounted on the central shaft seat 6 to rotate by a certain angle around the central shaft seat force measurement rocker arm connecting shaft 6-1, and meanwhile, drives the No. 1 and No. 2 dual-ring connected force measurement sensors 4-1 and 4-2 connected between the four-hole connected track changing force measurement rocker arm 3 and the left lifting support track changing moving body 1 and between the four-hole connected track changing force measurement rocker arm 3 and the right lifting support track changing moving body 2 to pull the left lifting support track changing moving body 1 and the right lifting support track changing moving body 2 to move towards the direction of the central shaft seat, so as to make the left lifting support track changing moving body 1 and the right lifting support track changing moving body 2 move to the direction of the central shaft seat by a certain distance along the long guide tracks of the fixed bottom plate, thereby completing the movement of changing from wide track gauge to narrow track gauge.

Step 3, the lifting airbags can be deflated to make the left and right lifting moving upper plates move downward to reset along the left and right vertical lifting moving guide posts 17 and 6-5, so that the drive wheels are separated from the wheel pairs, thereby facilitating high-speed traveling of the wheel pairs in an actual movement process.

Although the embodiment of the present disclosure has been disclosed as above, it is not limited to the applications listed in the description and the implementation manner. The embodiment is completely applied to various fields suitable for the present disclosure. For those familiar with the art, additional modifications can be easily implemented. Therefore, without departing from the general concept defined by the claims and the equivalent scope, the present disclosure is not limited to specific details and the illustrations shown and described herein.

What is claimed is:
1. A dual-drive wheel track changing system configured for a research on track changing performance, the system comprising:
   a left lifting support track changing moving body,
   a right lifting support track changing moving body,
   a four-hole connected track changing force measurement rocker arm,
   a No. 1 dual-ring connected force measurement sensor,
   a No. 2 dual-ring connected force measurement sensor,
   a track changing driving actuator, and
   a central shaft seat, wherein the central shaft seat further includes:
      the four-hole connected track changing force measurement rocker arm is connected to each of the left lifting support track changing moving body and the right lifting support track changing moving body through the No. 1 and No. 2 dual-ring connected force measurement sensors, respectively;

the left lifting support track changing moving body and the right lifting support track changing moving body are arranged on the left side and the right side of the central shaft seat; and the track changing driving actuator drives the left lifting support track changing moving body and the right lifting support track changing moving body to change tracks through the four-hole connected track changing force measurement rocker arm.

2. The dual-drive wheel track changing system according to claim 1, wherein the four-hole connected track changing force measurement rocker arm further includes:

a four-hole connected track changing force measurement rocker arm body, two four-hole connected track changing force measurement rocker arm bearing pin shaft bodies mounted on the four-hole connected track changing force measurement rocker arm body, a central shaft seat force measurement rocker arm connecting bearing, and a track changing driving connecting pin shaft; and the four-hole connected track changing force measurement rocker arm is connected to the central shaft seat through the central shaft seat force measurement rocker arm connecting bearing, and is connected to the No. 1 and No. 2 dual-ring connected force measurement sensors through the two four-hole connected track changing force measurement rocker arm bearing pin shaft bodies, and is connected to the track changing driving actuator through the track changing driving connecting pin shaft.

3. The dual-drive wheel track changing system according to claim 1, wherein:

the track changing driving actuator is located on one side of the left lifting support track changing moving body;

a track changing driving actuator connecting base is mounted on the external Ema beam structure through a shaft seat; and a track changing driving actuator connecting lock ring is connected to the four-hole connected track changing force measurement rocker arm through the track changing driving connecting pin shaft to achieve an effect of pushing track changing.

4. The dual-drive wheel track changing system according to claim 1, wherein:

the central shaft seat is fixed between the left and right lifting support track changing moving bodies;

the centers of the bottom surfaces of the central shaft seat and the left and right lifting support track changing moving bodies are in a straight line;

the central shaft seat is bolted to the external integral structure constructed by Ema beams;

a central shaft seat force measurement rocker arm connecting shaft (6-1) is connected to the four-hole connected track changing force measurement rocker arm body by penetrating through the central shaft seat force measurement rocker arm connecting bearing; the two ends of the No. 1 and No. 2 dual-ring connected force measurement sensors (4-1) and (4-2) are connected to the four-hole connected track changing force measurement rocker arm body through the four-hole connected track changing force measurement rocker arm bearing pin shaft bodies respectively; and the two dual-ring connected force measurement sensors and the track changing force measurement connecting rocker arm are connected and arranged in a Z shape.

5. The dual-drive wheel track changing system according to claim 1, wherein:

the left lifting support track changing moving body and the right lifting support track changing moving body are of the same structure;

the left lifting support track changing moving body includes a left mounting guide track bottom plate, a left track changing sliding middle plate body, a left lifting airbag, a left track changing vertical moving upper plate, and wheels;

the left mounting guide track bottom plate is fixedly mounted on an external integral Ema beam structure;

two long guide tracks are arranged on the left mounting guide track bottom plate;

the left track changing sliding middle plate body includes four left vertical lifting moving guide posts, left track changing guide track sliding clamping seat sliding block bodies, and a No. 1 bearing pin shaft body arranged on a left track changing sliding support middle plate;

the left vertical lifting moving guide posts and the left track changing guide track sliding clamping seat sliding block bodies are respectively arranged at the four corners of the upper surface and the lower surface of the left track changing sliding support middle plate;

ribs are arranged on the lower surface of the left track changing sliding support middle plate;

the four left vertical lifting moving guide posts are mounted on the left track changing sliding support middle plate through left track changing sliding support middle plate through hole cylinders (16-2) respectively;

the No. 1 bearing pin shaft body is mounted on the left track changing sliding support middle plate through a left track changing sliding support middle plate protruding hollow cuboid;

the left track changing guide track sliding clamping seat sliding block bodies are fixed to the lower surface of the left track changing sliding support middle plate through bolting bodies respectively, and are matched with the two long guide tracks on the guide track bottom plate; and a circular hole in one end of the No. 1 dual-ring connected force measurement sensor is placed in the protruding hollow cuboid and is coaxial with the circular hole of the hollow cuboid, so that the No. 1 bearing pin shaft body is arranged therein in a sleeving manner to connect the four-hole connected track changing force measurement rocker arm to the left track changing sliding support middle plate.

6. The dual-drive wheel track changing system according to claim 5, wherein:

the left lifting airbag is arranged between the left track changing sliding support middle plate and the left track changing vertical moving upper plate, and is circumferentially fixed to the left track changing sliding support middle plate by bolts.

7. The dual-drive wheel track changing system according to claim 5, wherein:

the left track changing vertical moving upper plate includes a left track changing vertical moving upper plate base plate, four drive wheel assembling bearing seats, eight bearing seat connecting plate bolted assembling bodies (23), a left No. 1 drive wheel, a left No. 2 drive wheel, a left motor drive wheel roller chain wheel, a left dual-drive wheel connecting chain, and a left planetary reducer motor assembling body;

a circular hole corresponding to the protruding hollow cuboid is formed in the left lifting moving upper plate base plate; and hollow left vertical moving upper plate bottom plate bearing cylinders are arranged at the four corners of the left track changing vertical moving upper plate base plate, are assembled with the four left vertical lifting moving guide posts in the left track changing sliding middle plate body in a matched manner through linear movement bearings arranged in the cylinders, and move up and down along the guide posts.

8. The dual-drive wheel track changing system according to claim 7, wherein:

two ribbed plates are arranged on the left lifting moving upper plate base plate;

the left No. 1 drive wheel and the left No. 2 drive wheel are respectively fixed to the ribbed plate through the drive wheel assembling bearing seats, and are connected through the left dual-drive wheel connecting chain;

the left No. 1 drive wheel is driven by the left motor drive wheel roller chain wheel through the left planetary reducer motor assembling body; and the wheels are placed on the left No. 1 drive wheel and the left No. 2 drive wheel to simulate actual track changing movement of the wheel pairs.

* * * * *